United States Patent [19]

Nagai

[11] 4,192,700
[45] Mar. 11, 1980

[54] PROCESS FOR FUSION-BONDING OF RESINS

[76] Inventor: Kazuyoshi Nagai, 17-6, Kumisawa-Cho, Totsuka-Ku, Yokohama City, Kanagawa Pref., Japan

[21] Appl. No.: 27,261

[22] Filed: Apr. 5, 1979

[51] Int. Cl.² .......................... B29C 19/02; B05D 3/06
[52] U.S. Cl. .................................. 156/272; 427/53.1; 427/195; 250/492 R
[58] Field of Search .......................... 156/272; 427/53

[56] References Cited

U.S. PATENT DOCUMENTS 3,271,220  9/1966  Geen ...................................... 156/272
3,740,287  6/1973  Eichhorn ............................... 427/53
4,156,626  5/1979  Souder ................................... 156/272

*Primary Examiner*—Douglas J. Drummond
*Attorney, Agent, or Firm*—James E. Nilles

[57] ABSTRACT

A process for fusion-bonding of resins, which comprises applying a thermoplastic resin having a melting point of 40° to 300° C. to a paper and fusion-bonding the resin to the paper by emission energy of a flash discharge lamp. The energy emission density of the flask discharge lamp is controlled relative to an electric input energy necessary for irradiation, the inner diameter of the bulb of the flash discharge lamp, the flash discharge passage length, and the pulse width.

3 Claims, 3 Drawing Figures

PROCESS FOR FUSION-BONDING OF RESINS

BACKGROUND OF THE INVENTION (1) Field of the Invention:

The present invention relates to a process for fusion-bonding a resin to a paper.

(2) Description of the Prior Art:

Heating methods customarily used for thermally softening or fusion-bonding resins include a heat transfer heating method in which a resin is caused to fall in contact with a heat source and a non-contact heating method in which a resin is not caused to fall in contact with a heat source but is heated by, for example, ultrasonic heating or high frequency heating. These methods have merits and demerits and an appropriate method is selected according to the intended use and object.

For example, when even a slight contamination is not desired, the contact method is not preferred, but this method is advantageous in that the equipment is relatively small in size and is simple in structure. The non-contact ultrasonic or high frequency heating method is advantageous in that a resin is not contaminated at all, but is disadvantageous in that the size of the heating apparatus is large and the maintenance thereof is very troublesome.

SUMMARY OF THE INVENTION

An object of the present invention is to provide a process for fusion-bonding of resins in which a powdery or filmy resin is heated and softened by a novel heating method quite different from the conventional heating methods and the softened resin is fusion-bonded to a paper or plastic plate. The process of the present invention is characterized in that a flash discharge lamp having a small heat capacity and being capable of generating heat instantaneously when required is used as a heat source and the energy emission density represented by the following formula:

$$Q = J/(P/4 D^2 L t)$$

wherein Q stands for the energy emission density (joule/cm$^3$·msec), J stands for an electric input energy (joule) necessary for irradiation of one sheet of the material to be heated, D stands for the inner diameter (cm) of the bulb of the flash discharge lamp, L stands for the flash discharge passage length (cm), t stands for the pulse width (msec) corresponding to ½ of the peak value of the electric current wave form, and P stands for the circumference ratio, is controlled so as to fusion-bond the resin sufficiently to the paper as the substrate without deterioration of the paper as the substrate, by changing the electric input supplied to the heat source per unit time per unit volume.

Other objects and features of the present invention will be apparent from the following detailed description made with reference to the accompanying drawing.

DETAILED DESCRIPTION OF THE PREFERRED EMBODIMENTS

Figure 1:
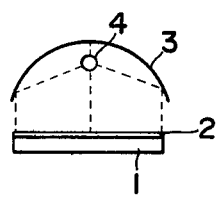
FIG. 1 is a diagram illustrating the method in which a resin is fusion-bonded to a paper by flashes of a flash discharge lamp.
Figure 2:
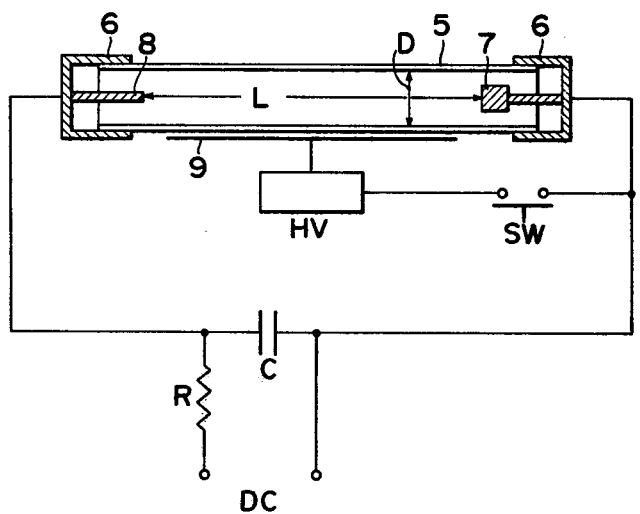
FIG. 2 is a diagram illustrating a flash discharge lamp and a power source circuit.

FIG. 1 illustrates the state where a resin film 2 is fusion-bonded to a paper 1 by using a flash discharge lamp 4 including a mirror 3 disposed adjacently thereto. FIG. 2 illustrates an instance of the structure of the flash discharge lamp 4 and a power source circuit therefor. Referring to FIG. 2, both the ends of a glass bulb 5 are air-tightly sealed by metal caps 6. Reference numerals 7 and 8 represent a cathode and an anode, respectively, and reference symbols L and D represent the flash discharge passage length and the inner diameter of the bulb 5, respectively. The power source circuit for causing emission in the flash discharge lamp 4 comprises a charging resistor R, a discharging capacitor C, a high voltage generator HV, a trigger switch SW, and a trigger electrode 9 connected to this high voltage generator HV.

Emission is caused in the flash discharge lamp 4 in the following manner.

Namely, the trigger switch SW is closed to give a high electric field to the flash discharge lamp 4 and ionize a filled gas contained between the cathode and anode. Thus, the charge of the discharging capacitor C is discharged through between the cathode and anode to cause emission in the flash discharge lamp 4.

In the present invention, the so generated flash is utilized as a heat energy. Since a paper or resin has peculiar properties to the light, even if the flash is radiated according to the method illustrated in FIG. 1, the resin film is not always fusion-bonded to the paper in a good state. More specifically, a resin has ordinarily a good permeability to ultraviolet rays, visible rays and infrared rays, and therefore, even if a flash is radiated to a resin, the temperature cannot be elevated to a level sufficient to enable fusion-bonding of the resin.

Accordingly, in the presence of the present invention, it is important that a heat absorbing agent capable of absorbing heat should be incorporated in advance into a resin to be fusion-bonded or the resin should be coated in advance with the heat absorbing agent.

Samples of the resin and paper used at the fundamental tests leading to the present invention were prepared, for example, in the following manner.

A powder mixture formed by mixing a polyethylene powder having a size of about 3 microns homogeneously with a carbon powder having a size of about 1 micron at a volume ratio of about 0.8/1 was applied in the form of a layer having a thickness of 10 to 50 microns on a commercially available blue plotting paper. When the particle size is small, the non-uniformity of the thickness of the resin layer is naturally small, but when the particle size is as large as about 100 microns, the thickness of the resin layer is non-uniform more or less. In such case, if the resin is fusion-bonded to a broad area, a defect of uneven thickness is brought about, but if the fusion-bonding area is about 50 cm × about 50 cm, the effect of the present invention is not substantially influenced even in such case.

When such sample is employed, the resin can be fusion-bonded to the blue plotting paper by the emission energy of the flash discharge lamp 4. For example, the resin can be fusion-bonded to the blue plotting paper in a good state if emission is conducted under such conditions that the discharge passage length L is 26 cm, the inner diameter D of the bulb is 8 mm, the amount filled of xenon gas is 200 mmHg, the energy emission density is 20.4, the electric input J is 800 joules and the value t is 3 msec. Various flash lamps were prepared by filling rare gases such as xenon and mixed gases in glass bulbs having an inner diameter larger than 3 mm and a discharge passage length longer than 5 cm, and by using these flash lamps, fusion-bonding tests were carried out under different energy emission density values Q in the range of from 0.1 to 1000. As a result, it was found that the blue plotting paper was often scorched or discolored, and that this undesirable phenomenon took place when the energy emission density of the flash discharge lamp was too high or too low. Therefore, further investigations were made on this point. It was found that when the value Q was smaller than 1, a long time was required for completion of fusion-bonding and that if flashing was repeated many times until fusion-bonding was completed, white portions of the plotting paper were discolored. It also was found that if the value Q was larger than 600, fusion-bonding was completed in a short time but white portions of the plotting paper was simultaneously discolored. Thus, it was confirmed that in order to fusion-bond a resin to a paper by flash from a flash discharge lamp without discoloration of the paper, it is necessary to control the value Q of the emission of the flash discharge lamp within the range of from 1 to 600 ($1 \leq Q \leq 600$).

Figure 3:
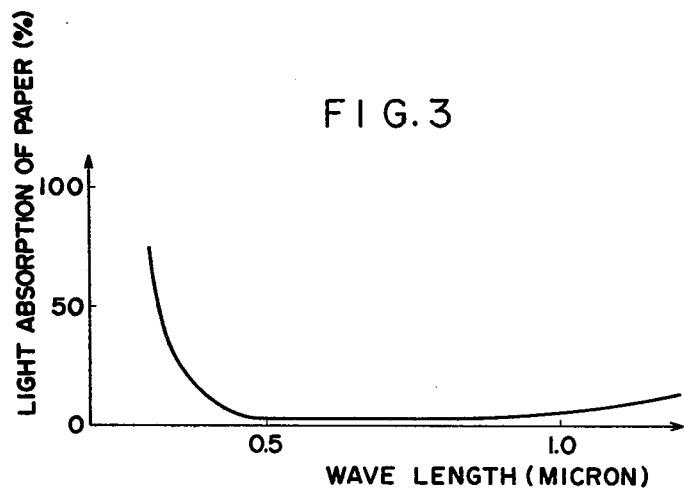
FIG. 3 is a curve showing the light absorption of a white paper.

When the light absorption of a white paper is examined, it is seen that as shown in FIG. 3, when the wave length is shorter than 0.4 micron, the light absorption is abruptly increased and when the wave length is longer than 0.8 micron, the light absorption is gradually increased. In case of flash emission, if the proportion of ultraviolet rays or the proportion of infrared rays is too large, paper per se absorbs the flash very well and the temperature of the paper is increased, and therefore, it is estimated that the paper is readily discolored by scorching in such case.

When spectrum characteristics corresponding to the cases of $Q<1$, $1 \leq Q \leq 600$ and $Q>600$ are examined, it is seen that in case of $Q<1$, the radiation energy of the wave length region exceeding 0.8 micron occupies more than about 28% of the total radiation energy and in case of $Q>600$, the radiation energy of the wave length region below 0.4 micron occupies more than 33% of the total radiation energy. Also in view of this fact, it will readily be understood that the case of $Q<1$ or $Q>600$ is not preferred.

As will be apparent from the foregoing illustration, in the present invention, there is adopted a novel heating method utilizing the emission energy of a flash discharge lamp, which is quite different from the conventional heating methods, and a powdery or filmy resin is fusion-bonded to a paper by utilizing this novel heating method, and from the viewpoints of peculiar properties of the paper and resin, the energy emission density Q of the flash emission of the flash discharge lamp is controlled in the range of $1 \leq Q \leq 600$, whereby fusion-bonding can be performed effectively and advantageously.

It is preferred that the melting point of the resin that is used in the present invention be within the range of from 40° C. to 300° C.

The prominent merit of the non-contact heating method, that is, the merit that the resin is not contaminated, can be attained in the present invention. Moreover, since the heat source used in the present invention comprises a flash discharge lamp, a mirror disposed adjacently thereto and a power source circuit, the heat source can be maintained, handled and controlled very easily. Accordingly, the process of the present invention has a high practical value.

The process of the present invention can be advantageously applied to preparation of laminate papers comprising a paper and a resin coating or fusion fixation of toners to copying sheets in an electrophotographic copying machine.

What is claimed is:

1. A process for fusion-bonding of resins, which comprises applying a powdery or filmy thermoplastic resin having a melting point of 40° to 300° C. to a paper and fusion-bonding the resin to the paper by emission energy of a flash discharge lamp comprising a glass bulb filled with a rare gas as the main component, wherein the energy emission density of the flash discharge lamp, which is represented by the following formula:

$$Q = J/((P/4)D^2 L t)$$

wherein Q stands for the energy emission density (joule/cm$^3$·msec), J stands for an electric input energy (joule) necessary for irradiation of one sheet of the material to be heated, D stands for the inner diameter (cm) of the bulb of the flash discharge lamp, L stands for the flash discharge passage length (cm), t stands for the pulse width (msec) corresponding to ⅓ of the peak value of the electric current wave form, and P stands for the circumference ratio, is controlled within a range of $1 \leq Q \leq 600$.

2. A fusion-bonding process according to claim 1 wherein a heat absorbing agent is incorporated in the thermoplastic resin.

3. A fusion-bonding process according to claim 1 wherein the thermoplastic resin is coated with a heat absorbing agent.

* * * * *